United States Patent
Warke et al.

(10) Patent No.: US 10,353,062 B2
(45) Date of Patent: Jul. 16, 2019

(54) METHODS AND APPARATUS FOR NARROWBAND RANGING SYSTEMS USING REFERENCE SIGNAL INTERPOLATION

(71) Applicant: Texas Instruments Incorporated, Dallas, TX (US)

(72) Inventors: Nirmal C. Warke, Saratoga, CA (US); David P. Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 121 days.

(21) Appl. No.: 15/208,945

(22) Filed: Jul. 13, 2016

(65) Prior Publication Data
US 2018/0017671 A1 Jan. 18, 2018

(51) Int. Cl.
| | | |
|---|---|---|
| G01S 13/08 | (2006.01) | |
| G01S 15/08 | (2006.01) | |
| G01S 17/08 | (2006.01) | |
| G01S 13/00 | (2006.01) | |

(52) U.S. Cl.
CPC ............. G01S 13/08 (2013.01); G01S 15/08 (2013.01); G01S 17/08 (2013.01)

(58) Field of Classification Search
CPC .......... G01S 13/08; G01S 15/08; G01S 17/08; G01S 7/023; G01S 7/4008; G01S 7/2806; G01S 13/003; G01S 13/282; G01S 13/288; G01S 13/56; G01S 13/26; G01R 13/34

See application file for complete search history.

(56) References Cited

U.S. PATENT DOCUMENTS

| | | | | | |
|---|---|---|---|---|---|
| 3,662,388 | A | * | 5/1972 | Mott | G01S 7/2806 342/132 |
| 3,720,950 | A | * | 3/1973 | Vehrs, Jr. | G01S 13/288 342/132 |
| 4,697,184 | A | * | 9/1987 | Cheal | G01S 13/56 340/554 |

(Continued)

OTHER PUBLICATIONS

M. K. Baczyk et al., "Decoding and Reconstruction of Reference DVB-T Signal in Passive Radar System"; published in the Proceedings of the 11th International Radar Symposium; IEEE, Piscataway, NJ, USA; Aug. 12, 2010; INSPEC Accession No. 11474438. (Year: 2010).*

(Continued)

*Primary Examiner* — Bernarr E Gregory
(74) *Attorney, Agent, or Firm* — Michael A. Davis, Jr.; Charles A. Brill; Frank D. Cimino

(57) ABSTRACT

Methods and apparatus to determine an accurate distance to a target using reference signal interpolation is disclosed. An example apparatus includes an interpolator to receive a first sample of a reference signal and a second sample of a reference signal; and interpolating a reconstructed reference signal sample based on the first and second samples, the reconstructed reference signal corresponding to the reference signal; a correlator to generate a plurality of phase-shifted, reconstructed reference signals; and correlate each of the plurality of phase-shifted, reconstructed reference signals with a reflected signal; and an optimal phase selector to determine an optimal phase based on the correlations and output a distance to a target based on the optimal phase.

18 Claims, 7 Drawing Sheets

(56) References Cited

U.S. PATENT DOCUMENTS

| | | | | |
|---|---|---|---|---|
| 4,928,251 A * | 5/1990 | Marzalek | ............... | G01R 13/34 |
| | | | | 324/76.39 |
| 5,075,878 A | 12/1991 | Ohtomo et al. | | |
| 5,134,411 A * | 7/1992 | Adler | ...................... | G01S 7/023 |
| | | | | 342/128 |
| 5,309,161 A * | 5/1994 | Urkowitz | ............... | G01S 13/288 |
| | | | | 342/111 |
| 5,495,252 A * | 2/1996 | Adler | ...................... | G01S 7/023 |
| | | | | 342/127 |
| 5,719,580 A * | 2/1998 | Core | ..................... | G01S 7/4008 |
| | | | | 342/100 |
| 6,087,981 A * | 7/2000 | Normant | ............... | G01S 13/282 |
| | | | | 342/131 |
| 6,121,918 A * | 9/2000 | Tullsson | ................. | G01S 7/023 |
| | | | | 342/128 |
| 8,179,307 B2 * | 5/2012 | De Gramont | ......... | G01S 13/003 |
| | | | | 342/118 |
| 10,088,554 B2 * | 10/2018 | Cirillo | ................... | G01S 7/4008 |
| 2005/0206557 A1 * | 9/2005 | Holmberg | ............... | G01S 13/26 |
| | | | | 342/191 |
| 2011/0133783 A1 | 6/2011 | Glass et al. | | |

OTHER PUBLICATIONS

X. R. Wan et al., "Reconstruction of Reference Signal for DTMB-based Passive Radar Systems"; published in the Proceedings of the 2011 IEEE CIE International Conference on Radar; pp. 165-168; IEEE, Piscataway, NJ, USA; Mar. 1, 2012; INSPEC Accession No. 12589486. (Year: 2012).*

International Search Report for PCT/US2017/041971 dated Oct. 5, 2017.

* cited by examiner

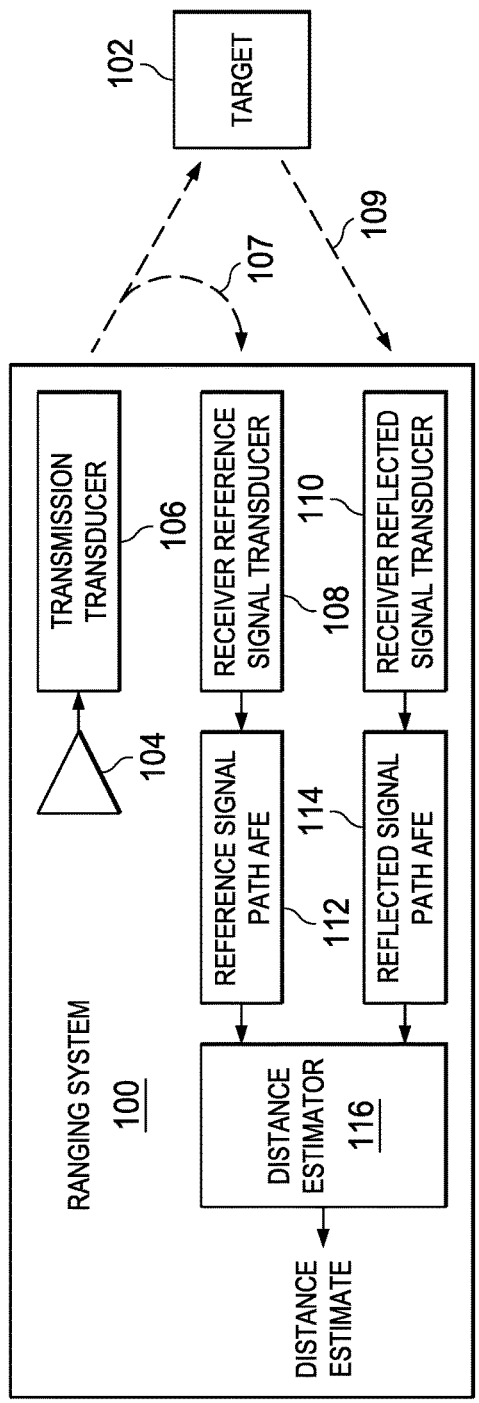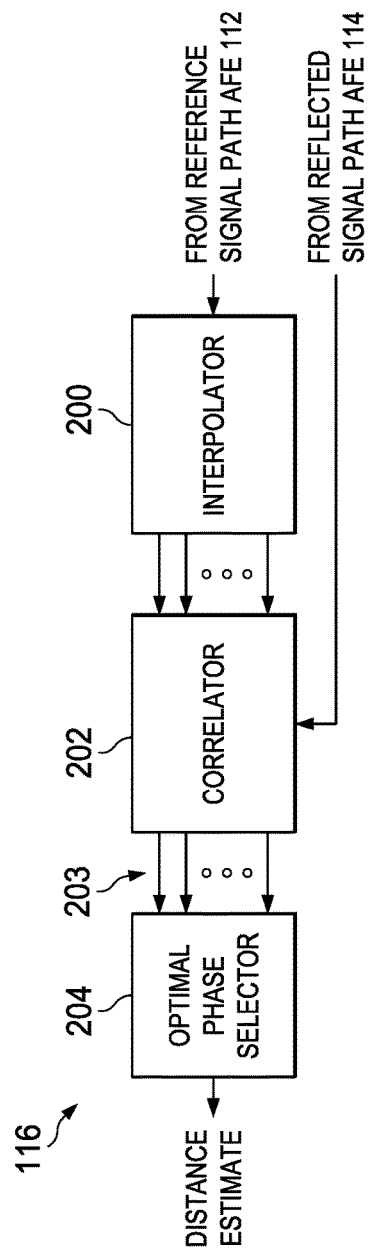

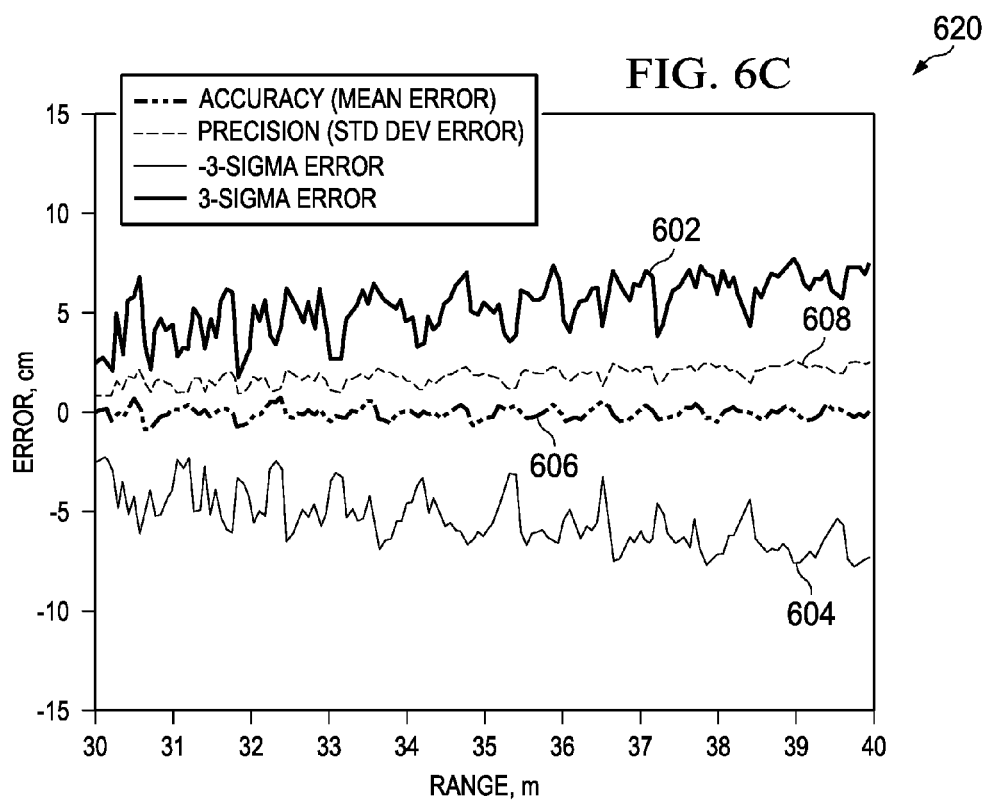
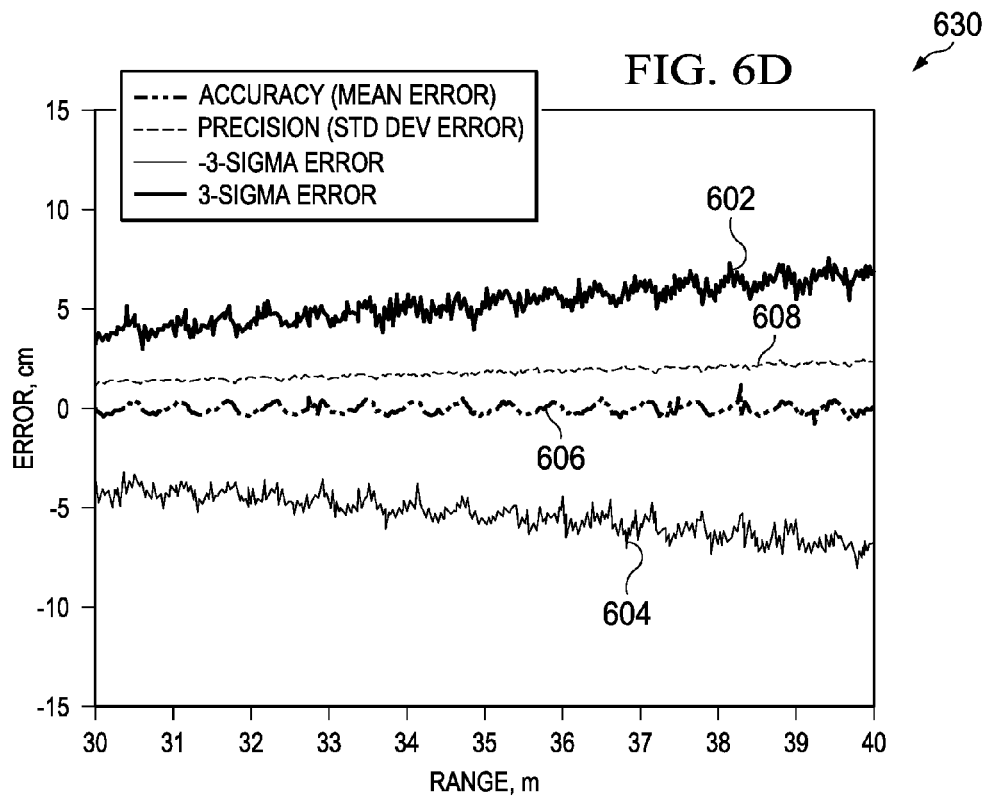

METHODS AND APPARATUS FOR NARROWBAND RANGING SYSTEMS USING REFERENCE SIGNAL INTERPOLATION

FIELD OF THE DISCLOSURE

This disclosure relates generally to ranging systems and, more particularly, to methods and apparatus for narrowband ranging systems using reference signal interpolation.

BACKGROUND

A ranging system (e.g., RADAR, LIDAR, SONAR, etc.) determines a distance to a target by transmitting a signal (e.g., radio signals, light signals, sound signals, etc.) at the target. The transmitted signal is reflected off the target and back to the ranging system. The ranging system compares received signals to the transmitted signal to determine when the reflected signal has been received. Such a ranging system measures the distance to the target based on the amount of time between when the signal was transmitted and when the reflected signal was received.

SUMMARY

Examples disclosed herein determine an accurate distance to a target using reference signal interpolation. An example apparatus includes an interpolator to receive a first sample of a reference signal and a second sample of a reference signal and interpolating a reconstructed reference signal sample based on the first and second samples, the reconstructed reference signal corresponding to the reference signal. Such an example apparatus further includes a correlator to generate a plurality of phase-shifted, reconstructed reference signals and correlate each of the plurality of phase-shifted, reconstructed reference signals with a reflected signal. Such an example apparatus further includes an optimal phase selector to determine an optimal phase based on the correlations and output a distance to a target based on the optimal phase.

BRIEF DESCRIPTION OF THE DRAWINGS

FIG. 1 is an illustration of an example ranging system that determines a distance to an example target.

FIG. 2 is a block diagram of an example distance estimator of FIG. 1.

FIGS. 6A-D are graphs illustrating phase and precision of the example ranging system of FIG. 1 at four different phase interpolations.

The figures are not to scale. Wherever possible, the same reference numbers will be used throughout the drawing(s) and accompanying written description to refer to the same or like parts.

DETAILED DESCRIPTION

Figure 3:
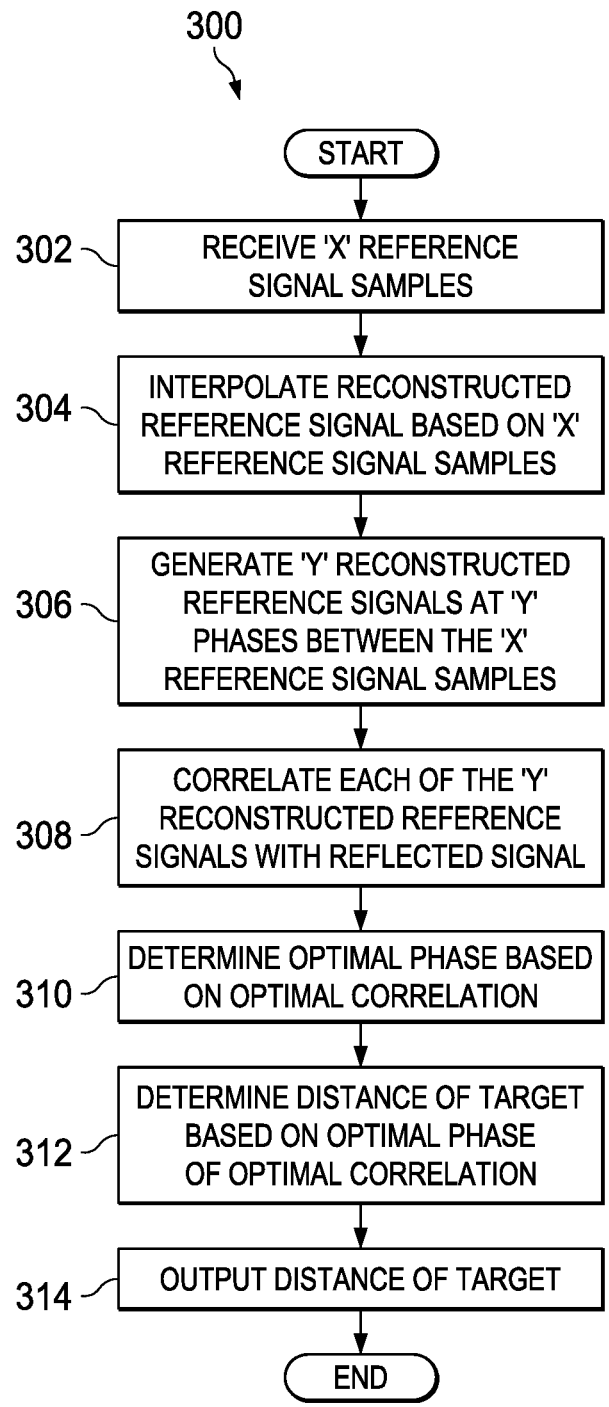
FIG. 3 is a flowchart representative of example machine readable instructions that may be executed to implement the example distance estimator of FIG. 2 to determine the distance to the example target of FIG. 1.

Ranging systems used to determine distances to various objects have become increasingly popular with advances in robotic technologies, automotive technologies, etc. Ranging systems determine distances by transmitting a signal to an object (e.g. a target). The transmitted signal reflects off the object and returns to the ranging system. The ranging system determines when the reflected signal has been received and determines the distance of the target based on the duration of time between when the signal was transmitted and when the reflected signal was received. Example ranging systems include radio detection and ranging (RADAR) systems, light detection and ranging (LIDAR) systems, sound detection and ranging (SONAR) systems. Ranging systems may be used to help robots interact with objects, transport to various locations, etc. Additionally, ranging systems may be used in automobiles to provide safety features and autonomous driving systems. Distance estimation from such ranging systems requires high accuracy and precision to properly function. As ranging systems become more popular, a low cost, less complex, power saving implementation of a ranging system is highly desirable.

One conventional technique of implementing a highly accurate and precise ranging system includes using a high rate analog-to-digital converter (e.g., 1 gigasamples per second) to convert received signals into digital samples. The digital samples are compared to a transmitted signal to determine when a received signal matches the transmitted signal identifying the time of flight of the transmitted signal. As described above, the time of flight corresponds to the distance of the target. However, the high rate analog-to-digital converter of such a conventional technique is complex, expensive, and consumes a lot of power. Another conventional technique implements a low rate analog-to-digital converter (e.g., 100 megasamples per second) to convert received signals into digital samples. The digital samples are compared to a transmitted signal to determine when a received signal matches the transmitted signal identifying the time of flight of the transmitted signal. However, because such a conventional technique samples at a low rate, the time of flight measurement loses some of the granularity of a ranging system with a high rate analog-to-digital converter. Thus, such a conventional technique has less accurate and less precise distance estimations. Examples disclosed herein provide a ranging system with the accuracy and precision approaching that of a ranging system with a high rate analog-to-digital converter with the cost, complexity, and power consumption of a ranging system with a low rate analog-to-digital converter.

Examples disclosed herein include a ranging system with an analog front end device to convert a received signal into digital samples representative of the received signal at a low rate to reduce cost, complexity, and power. The ranging system includes a transmission transducer to transmit a signal (e.g., a light signal, a radio signal, a sound signal, etc.) to an object. The ranging system also includes a receiver transducer(s) to receive the transmitted signal directly from the transmission transducer and a transmitted signal after being reflected off the object. As used herein, a "reference signal" is defined as the signal transmitted by the transmission transducer after being received by a receiver transducer and a "reflected signal" is defined as the transmitted signal after being reflected off of the object and received by a receiver transducer. Although the reference signal and the reflected signal are based on the same transmitted signal, the reflected signal has traveled a much farther distance and has been reflected off the object. Thus, the reflected signal may be subject to additional noise and may be oscillating with a different phase and/or may have a different amplitude than the reference signal.

The ranging system disclosed herein includes a reference signal path analog front end to receive the reference signal and a reflected signal path analog front end to receive all other signals including the reflected signal. In some examples, the analog front end includes an analog-to-digital converter to convert the received signals into samples at a low rate. Examples disclosed herein utilize a distance estimator to determine the distance of the object based on a comparison of the samples associated with reference signal path and samples associated with the reflected signal path.

Because the reference signal path analog front end samples at a low rate, examples disclosed herein interpolate a reconstructed reference signal based on reference signal samples. As used herein, a "reconstructed reference signal" is an interpolated function representative of the reference signal based on the reference signal samples. The reconstructed reference signal is correlated with the reflected signal samples to determine when the reflected signal has been received. When the reflected signal samples are correlated to the reconstructed reference signal, the correlation will contain a peak at a delay that corresponds to the target distance. When the peak is lower than a predetermined threshold, a determination may be made that there is no target present or that the target is not detectable.

Examples disclosed herein generate a plurality of reconstructed reference signals at different phase offsets to increase the accuracy and precision of the distance estimate within the distance range. Each of the plurality of reference signals is associated with a particular phase. As used herein, the "phase" is defined as a fractional time offset between two consecutive samples. Examples disclosed herein correlate each of the phase-shifted, reconstructed reference signals with the reflected signal samples. The correlation associated with the highest peak, the steepest peak, the highest peak to side lobe ratio, and/or any other optimal metric may be used to compute the precise delay of the reflected signal. Examples disclosed herein, identify the delay of the reflected signal based on the optimal phase associated with the optimal correlation and determine a distance to the object based, in part, on the optimal phase. Using examples disclosed herein, low rate sampling may be used to reduce cost, complexity, and power while phase-shifted interpolation increases the accuracy and precision of distance estimations (e.g., ranging).

The illustration of FIG. 1 illustrates an example ranging system 100 to determine a distance to the example target 102. The example ranging system 100 includes an example transmission signal generator 104, an example transmission transducer 106, an example transmitted signal 107, an example receiver reference signal transducer 108, an example reflected signal 109, an example receiver reflected signal transducer 110, an example reference signal analog front end (AFE) 112, an example reflected signal AFE 114, and an example distance estimator 116.

The example ranging system 100 of FIG. 1 is a system that transmits signal 107 to the example target 102 and receives the reflected signal 109 (e.g., the transmitted signal reflected off of the example target 102) to determine a distance of the example target 102. The example ranging system 100 may be a RADAR system, a LIDAR system, a SONAR system, an ultrasonic system, a hybrid system, and/or any other type of ranging system. As described above, a RADAR system utilizes radio signals (e.g., electromagnetic waves), a LIDAR system utilizes light signals, and a SONAR system utilizes and/or ultrasonic system sound signals, and a hybrid system uses a light signal modulated with a radio signal.

The example transmission signal generator 104 of FIG. 1 generates signals to be reflected off the example target 102. As described above, the signals may be light signals, sound signals, radio signals, hybrid signals, and/or any other type of signal. In some examples, the transmission signal generator 104 generates a pulse, a sinusoid, a square wave, a triangle wave, and/or any of type of signal. The example transmission signal generator 104 transmits the generated signal to the example transmission transducer 106 to transmit the generated signal (e.g., the transmitted signal 107).

The example transmission transducer 106 of FIG. 1 is an electrical device that outputs the generated signal from the example transmissions signal generator 104. In some examples, the transmission transducer 106 is an antenna (e.g., a beamform antenna) to transmit the signal (e.g., light signal, radio signal, and/or sound signal) to the example target 102. Alternatively, the transmission transducer 106 may be a diode (e.g. a light emitting diode, a laser diode, etc.) and/or any device capable of outputting light signals, radio signals, and/or sound signals.

The example receiver reference signal transducer 108 of FIG. 1 receives the transmitted signal 107 (e.g., the transmitted signal without being reflected off the example target 102) and processes the transmitted signal 107 to generate a reference signal. The transmitted signal 107 that is not reflected off the example target 102 is herein defined as a reference signal. The transmitted signal 107 may be different from the signal generated by the example transmission signal generator 104 due to front end system delay and/or other non-idealities. In some examples, the transmitted signal 107 is the ideal transmitted signal generated by the example transmission signal generator 104. Because the transmitted signal 107 is received directly from the example transmission transducer 106 (e.g., the transmitted signal 107 is not reflected off the example target 102 and travels a very short distance), the transmitted signal 107 (and thus, the reference signal) has a very high signal-to-noise ratio (SNR). Thus, interpolation of the reference signal can be performed with high accuracy. In some examples, because the wave form of the reference signal is known, interpolation can be optimized for the signal based on the wave form, as further described in conjunction with FIG. 2. The example receiver reference signal transducer 108 may be an antenna (e.g., a beamform antenna) and/or a diode (e.g. photodiode) to receive the signal (e.g., light signal, radio signal, and/or sound signal) from the example transmission transducer 106. Alternatively, the example receiver reference signal transducer 108 may be any device capable of receiving light signals, radio signals, and/or sound signals. In some examples, the receiver reference signal transducer 108 includes a low pass filter and a band limit filter to band limit the reference signal.

The example receiver reflected signal transducer 110 of FIG. 1 receives the reflected signal 109 after being reflected off the example target 102. The signal 109 that is reflected off the example target 102 is herein defined as a reflected signal. Because the example reflected signal 109 is not received directly from the example transmission transducer 106 (e.g., the transmitted signal 107 is reflected off the example target 102 and travels a long distance), the reflected signal 109 is subject to noise and may have a smaller SNR ratio than the reference signal. In some examples, the example reflected signal transducer 110 is an antenna (e.g., a beamform antenna) and/or a diode (e.g. photodiode) to receive the signal (e.g., light signal, radio signal, and/or sound signal) from the example transmission transducer 106 after being reflected of the example target 102. The example receiver reflected signal transducer 110 may be any device capable of receiving light signals, radio signals, and/or sound signals. In some examples, the receiver reflected signal transducer 110 includes a low pass filter and a band limit filter to band limit the reference signal 107.

The example reference signal path AFE 112 of FIG. 1 is a device that samples the reference signal (e.g., the transmitted signal 107 processed by the receiver reference signal transducer 108) periodically or aperiodically to generate a number (e.g., 'X') of reference signal samples. In some examples, the example reference signal path AFE 112 includes an analog to digital converter that converts the analog reference signal to digital samples. The example reference signal path AFE 112 is a low rate sampler that gathers a small number of samples per second to reduce power, complexity, and/or cost. In some examples, the sample rate is slightly higher than the Nyquist frequency so that the reference signal can be nearly perfectly recreated. The frequency of samples may be adjusted based on user and/or manufacturer preferences. The lower the sampling rate (e.g., frequency), the more power, complexity, and/or cost are reduced. The example reference signal path AFE 112 transmits the reference signal samples to the example distance estimator 116.

The example reflected signal path AFE 114 of FIG. 1 is a device that samples the received reference signal periodically or aperiodically to generate a number (e.g., 'Z') of reflected signal samples. In some examples, the reflected signal path AFE 114 includes an analog to digital converter that converts the analog reflected signal 109 to digital samples. In some examples, the example reflected signal path AFE 114 samples at the same rate as the example reflected signal path AFE 114 (e.g., 'X'='Z') after a delay to attempt to match the reflected signal 109 with the reference signal. In some examples, the sample rate is slightly higher than the Nyquist frequency so that the reference signal can be nearly perfectly recreated. In some examples, the reference signal AFE 112 and the reflected signal AFE 114 may be combined into one AFE that includes one or more analog to digital converts to convert the reflected signals 109 and the reference signals to digital samples. In some examples, components of the reference signal AFE 112 and/or the reflected signal AFE 114 may be shared between the reference signal path and the reflected signal path. The example reflected signal path AFE 114 transmits the reflected signal 109 (e.g., the 'Z' reflected signal samples representing the reflected signal) to the example distance estimator 116.

The example distance estimator 116 of FIG. 1 receives the 'X' reference signal samples and the 'Z' reflected signal samples. As explained below in conjunction with FIGS. 2 and 3, the example distance estimator 116 interpolates based on the 'X' reference signal samples to reconstruct the reference signal and generates 'Y' reconstructed reference signals of the same frequency as the reference signal at 'Y' different phase offsets between the 'X' reference signal samples. Additionally, the example distance estimator 116 correlates each of the 'Y' reconstructed reference signals with the reflected signal to create 'Y' correlation plots. Each of the 'Y' phases corresponds to a correlation plot. As further described in conjunction with FIG. 4, each correlation plot includes a peak and side lobes. The correlation plot with the best (e.g., highest) peak and/or the correlation plot with the highest peak to side lobe ratio corresponds to the optimal phase. The optimal phase gives the best estimate of the distance to the example target 102. The example distance estimator 116 determines the distance to the example target 102 by selecting the correlation plot associated with the optimal phase. In some examples, the distance estimator 116 generates a distance estimate signal based on the determined distance and/or the optimal phase.

FIG. 2 is a block diagram of an example implementation of the distance estimator 116 of FIG. 1, disclosed herein, to generate a distance estimate signal identifying the optimal phase used to determine the distance to the example target 102 of FIG. 1. While the example distance estimator 116 is described in conjunction with the example ranging system 100 and the example target 102 of FIG. 1, the example distance estimator 116 may be utilized to determine a distance from to any target using any ranging system. The example distance estimator 116 includes an example interpolator 200, an example correlator 202, example correlations 203, and an example optimal phase selector 204.

The example interpolator 200 of FIG. 2 receives the 'X' reference signal samples from the example reference signal path AFE 112 (FIG. 1). The example interpolator 200 interpolates a functional representation of the reference signal based on the received 'X' reference signal samples. In some examples, the interpolator 200 interpolates a function for each reference signal sample (excluding the first and last sample) based on the reference signal sample at a first time (e.g., n), a reference signal sample at a subsequent time (e.g., n+1) and a reference signal sample at a preceding time (e.g., n−1). In this manner, the interpolator 200 can create a piece-wise function (e.g., a spline interpolation) to represent reference signal. For example, the reference signal may be associated with a sinusoidally modulated pulse at a known frequency, ω. In such an example, the interpolator 200 interpolates around time n using the following sinusoidal modulated functions:

$$y_1 = a*\sin(\omega(n-1)) + b*\cos(\omega(n-1)) + c \quad \text{(Equation 1)}$$

$$y_2 = a*\sin(\omega(n)) + b*\cos(\omega(n)) + c \quad \text{(Equation 2)}$$

$$y_3 = a*\sin(\omega(n+1)) + b*\cos(\omega(n+1)) + c \quad \text{(Equation 3)}$$

Where $y_1$ is the measured sample energy of the reference signal at time n−1, $y_2$ is the measured sample energy of the reference signal at time n, $y_3$ is the measured sample energy of the reference signal at time n+1, and a, b, and c are unknown parameters to be solved for.

The example interpolator 200 of FIG. 2 solves the system (e.g., three equations, three unknowns) to interpolate the reference signal around sample time n. In some examples, the interpolator 200 generates and solves the reference signal around each time that a reference signal sample is received excluding the first and last reference signal samples. In such examples, the interpolator generates a piecewise function representative of the reference signal (e.g., and thus, the transmitted signal 107) based on the generated functions around each sample time. Additionally or alternatively, the example interpolator 200 may interpolate the reference signal samples using linear interpolation, cubic interpolation, spline interpolation, etc.

Once the example interpolator 200 of FIG. 2 has interpolated based on the reference signal samples to generate the reference signal, the interpolator 200 generates 'Y' reconstructed reference signals (e.g., Y reference interpolations) at incremental phases by shifting the generated reference signal incrementally by 1/Y of the distance between the two subsequent reference signal samples. For example, if the interpolator 200 is to generate ten reconstructed reference signals (e.g., ten times the reference interpolation) and the reference signal is sampled every 500 milliseconds, then the interpolator 200 generates a first reconstructed reference signal whose phase is shifted by 50 milliseconds (ms) (e.g., 500 ms/10), a second reconstructed reference signal whose phase is shifted by 100 milliseconds, a third reconstructed reference signal whose phase is shifted by 150 milliseconds, etc. In this manner, the interpolator 200 will generate 10 reconstructed reference signals with 10 different phase offsets equidistant from each other.

The example correlator 202 of FIG. 2 correlates (e.g., using cross-correlation) the 'Y' reconstructed reference signals (e.g., at 'Y' different phase offsets) to the reflected signal samples from the example reflected signal path AFE 114. The correlation identifies a similarity between each of the 'Y' reconstructed reference signals to the reflected signal. In some examples, the example correlator 202 cross correlates two signals using the following equation:

$$[S_1 * S_2](t) = \int_{-\infty}^{+\infty} S_1^*(\tau) S_2(\tau+t) d\tau \qquad \text{(Equation 4)}$$

Where $S_1^*$ is the complex conjugate of $S_1$.

Figure 4:
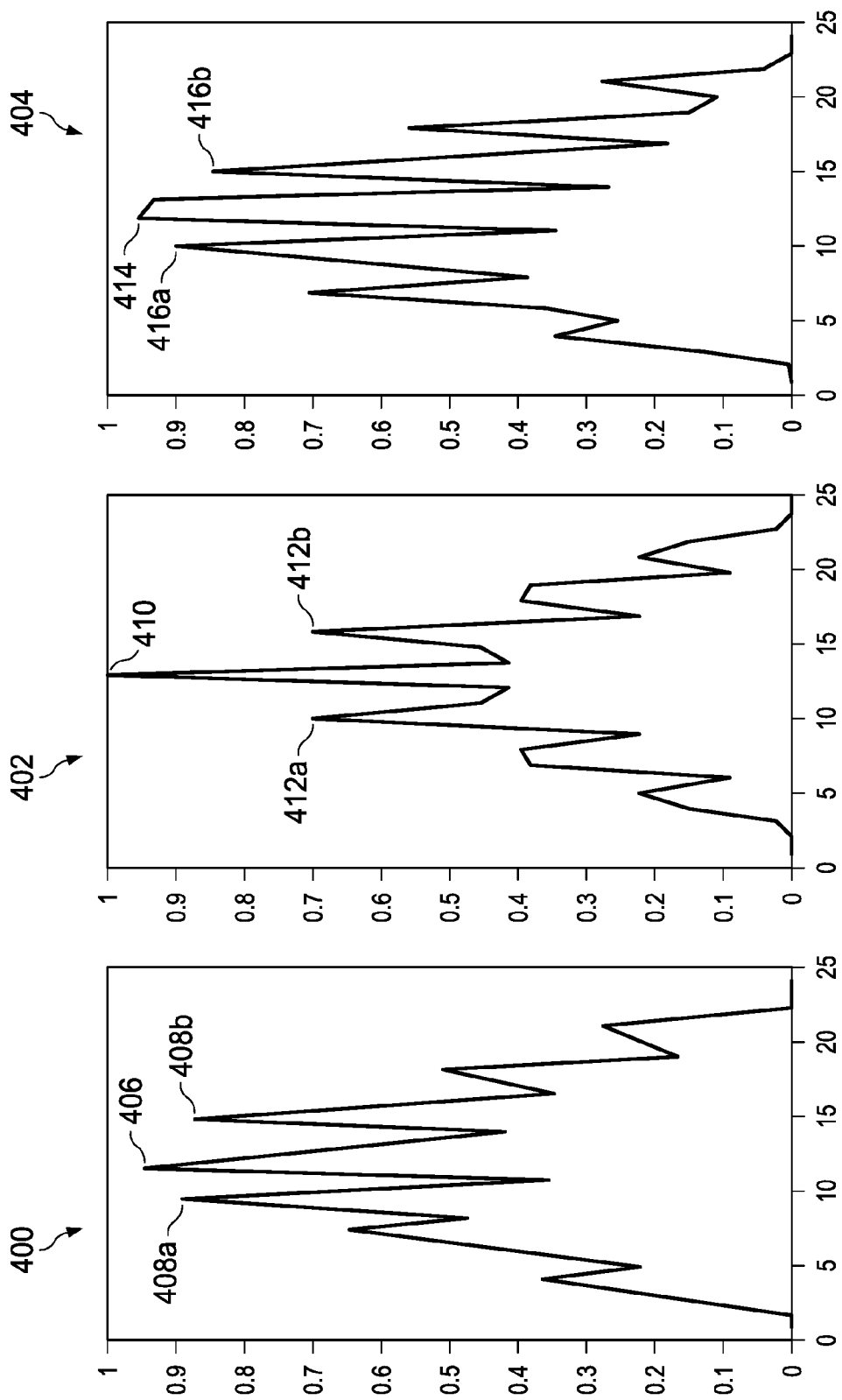
FIG. 4 are graphs illustrating example correlations of FIG. 2.

Correlation of reconstructed reference signals that more closely mirror the reflected signal (e.g., whose phases align) include certain characteristics including, but not limited to, a higher peak intensity value, a sharper peak intensity value, and/or a high peak to side lobe ratio, as further described in conjunction with FIG. 4. The example correlator 202 transmits the example correlations (e.g. cross-correlations) 203, each correlation corresponding to one of the 'Y' phases, to the example optimal phase selector 204. In some examples, such as when the correlations 203 do not include a peak higher than a threshold value, the example correlator 202 determines that the reflected signal 109 (FIG. 1) has not been received.

The optimal phase selector 204 of FIG. 2 gathers all of the example correlations 203 and selects the optimal correlation based on at least one of the peak intensity values, the sharpness of the peak intensity value, and/or the peak to side lobe ratio. As described above, because each of the 'Y' correlations corresponds to one of the 'Y' phases, the optimal correlation corresponds to the optimal phase. The optimal phase corresponds to the most accurate estimate of a distance of the example target 102 (FIG. 1). In some examples, the optimal phase selector 204 determines a correlation waveform around the optimal peak to determine a fine delay estimate. For example, because the correlation is based on samples at a low rate, the selected peak value may be close to the actual optimal peak, but not actually the optimal peak. In such examples, the optimal phase selector 204 may perform a curve fitting operation based on points near the optimal peak. Once the optimal phase selector 204 generates an optimal curve fitted function representative of the optimal peak, the optimal phase selector 204 will determine the optimal peak based on the curve fitted function. The curve fitting operation may be a parabolic curve fit, a sinusoidal curve fit, a center of gravity curve fit, and/or any other type of curve fit. The optimal phase selector 204 determines the distance to the example target 102 based on the selected phase. The example optimal phase selector 204 generates the distance estimate signal to reflect the phase and/or the distance associated with the example target 102. In some examples, the distance estimate signal is transmitted to a processor or circuit within or coupled to the example distance estimator 116.

While example manners of implementing the example distance estimator 116 of FIG. 1 are illustrated in FIG. 2, elements, processes and/or devices illustrated in FIG. 2 may be combined, divided, re-arranged, omitted, eliminated and/or implemented in any other way. Further, the example interpolator 200, the example correlator 202, the example optimal phase selector 204, and/or, more generally, the example distance estimator 116 of FIG. 2, may be implemented by hardware, machine readable instructions, software, firmware and/or any combination of hardware, machine readable instructions, software and/or firmware. Thus, for example, any of the example interpolator 200, the example correlator 202, the example optimal phase selector 204, and/or, more generally, the example distance estimator 116 of FIG. 2, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interpolator 200, the example correlator 202, the example optimal phase selector 204, and/or, more generally, the example distance estimator 116 of FIG. 2, is/are hereby expressly defined to include a tangible computer readable storage device or storage disk such as a memory, a digital versatile disk (DVD), a compact disk (CD), a Blu-ray disk, etc. storing the software and/or firmware. Further still, the example distance estimator 116 of FIG. 2 includes elements, processes and/or devices in addition to, or instead of, those illustrated in FIG. 3, and/or may include more than one of any or all of the illustrated elements, processes and devices.

A flowchart representative of example machine readable instructions for implementing the example distance estimator 116 of FIG. 2 is shown in FIG. 3. In the examples, the machine readable instructions comprise a program for execution by a processor such as the processor 712 shown in the example processor platform 700 discussed below in connection with FIG. 7. The program may be embodied in machine readable instructions stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 3, many other methods of implementing the example distance estimator 116 of FIG. 2 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example distance estimator 116 of FIG. 2 to determine the distance to the example target 102 of FIG. 1. As previously described, the determination of the distance is based on a duration of time between when a signal was transmitted and when the reflected signal 109 (FIG. 1) is received. The example distance estimator 116 determines the duration of time based on a count and a comparison of the reference signal and the phase of the reflected signal 109, the comparison generating the optimal phase. The optimal phase is the phase that has the highest peak, the steepest (e.g. most defined) peak, the highest peak to side lobe ratio, and/or any other optimal metric. Additionally, the optimal phase corresponds to the best estimate of the distance to the example target 102 within the distance range associated with the count.

The interpolator 200 receives 'X' reference signal samples from the example reference signal path AFE 112 (FIG. 1) (block 302). As described above in conjunction with FIG. 1, the 'X' reference signal samples correspond to the reference signal transmitted by the example transmission transducer 106 (FIG. 1). The 'X' reference signal samples correspond to low rate samples of the received reference signal taken by the example reference signal path AFE 112 (FIG. 1) periodically or aperiodically in time.

The example interpolator 200 interpolates a reconstructed reference signal based on the 'X' reference signal samples (block 304). As described above in conjunction with FIG. 1, the reference signal has a high SNR allowing the interpolator 200 to interpolate the reference signal (e.g., the reconstructed reference signal) with high accuracy. The example interpolator 200 may interpolate the reference signal using linear interpolation, cubic interpolation, spline interpolation, and/or any other type of interpolation. Additionally or alternatively, because the ranging system 100 (FIG. 1) generated the reference signal, the interpolator 200 may utilize the form of the generated reference signal to interpolate based on the 'X' reference signal samples, as described above in conjunction with FIG. 2.

The example interpolator 200 generates 'Y' reconstructed reference signals at 'Y' phases between the 'X' reference signal samples (block 306). For example, if the interpolator 200 is to generate three (e.g., Y=3) reconstructed reference signals (e.g., three times the reference interpolation) and the reference signal is sampled every 90 nanoseconds (ns), then the interpolator 200 generates a first reconstructed reference signal whose phase is shifted by 30 ns (e.g., 90 ns/3), a second reconstructed reference signal whose phase is shifted by 60 ns, and a third reconstructed reference signal whose phase is shifted by 90 ns. In this manner, the interpolator 200 will generate three reconstructed reference signals with three different phase offsets equidistant from each other. The example interpolator 200 transmits the 'Y' reconstructed reference signals at the 'Y' phases to the example correlator 202. Additionally, the example correlator 202 receives the reflected signal 109 (e.g., the reflected signal samples) from the example reflected signal path AFE 114 (FIG. 1).

The example correlator 202 correlates each of the 'Y' reconstructed reference signals with the reflect signal from the reflected signal path AFE 114 (e.g., the reflected signal 109 reflected off the example target 102 of FIG. 1) (block 308). As described above in conjunction with FIG. 2, the correlator 202 correlates each of the reconstructed reference signals using Equation 4. An example of the result of the correlation at three different phase offsets is shown and further described in conjunction with FIG. 4. The example correlator 202 transmits the example correlations 203 (FIG. 2) to the example optimal phase selector 204.

The example optimal phase selector 204 determines an optimal phase based on an optimal correlation of the example correlations 203 (block 310). As described above in conjunction with FIG. 2, the optimal correlation corresponds to the correlation with the highest peak, the steepest peak, the highest peak to side lobe ratio, and/or any other optimal metric. As described above in conjunction with FIG. 2, the optimal phase selector 204 may perform a curve fitting operation based on the optimal correlation to select the optimal phase based on the peak of the generated curve fitted function. The example selection of an optimal correlation is further described in conjunction with FIG. 4.

Once the optimal phase has been selected, the example optimal phase selector 204 and/or another circuit and/or processor coupled to or within the example distance estimator 116 determines the distance of the example target 102 based on the optimal phase (block 312). As described above, the optimal phase corresponds to the most accurate estimation of the distance. In some examples, the correlator 202 may combine blocks 308 and 310 to determine the optimal phase by correlating the 'Y' reconstructed reference signals with the reflected signal 109 using a tree search method. For example, the example correlator 202 may group the correlations 203 into branches using a tree search algorithm (e.g., a binary tree search algorithm). In this manner, if a correlation from one branch is clearly not optimal (e.g., the peak is below an optimal threshold and/or the peak to side lobe ratio is below a ratio threshold), then the correlator 202 may correlate a reconstructed reference signal from another branch. In this manner, the correlator 202 can reduce the number of correlations performed to determine the optimal phase. For example, the tree searching algorithm reduces the complexity of correlation from 'Y' correlations to $\log_2$ 'Y' correlations. Alternatively, a bubble sort, a shell sort, a comb sort, and/or any other type of sorting/searching algorithm may be used to determine the optimal correlation while reducing the number of computations. The example optimal phase selector 204 outputs the distance to the example target 102 (block 314). In some examples, the optimal phase selector 204 outputs the distance to a circuit and or processor coupled to and/or within the example distance estimator 116 of FIGS. 1 and 2.

FIG. 4 is an example illustration of three example correlations graphs 400, 402, 404 (e.g., the example correlations 203 of FIG. 2) that may be generated by the example correlator 202 of FIG. 2 based on a comparison of a reflected signal 109 to three reconstructed reference signals at the three different phase offsets. The first example correlation graph 400 includes an example peak 406 and example side lobes 408a, b. The second example correlation graph 402 includes an example peak 410 and example side lobes 412a, b. The third example correlation graph 404 includes an example peak 414 and example side lobes 416a, b.

The first example correlation graph 400 of FIG. 4 represents a correlation between a reflected signal and a reconstructed reference signal interpolated by the example interpolator 200 of FIG. 2 and shifted by a first phase. The example peak 406 represents the intensity of the energy for the correlation, the higher the intensity the more optimal the correlation plot. The example peak 406 of the first example correlation graph is about 0.95. The example side lobes 408a, b represent the intensity of the correlation whose intensity is closest to the peak 406. The intensity of the example side lobe 408a is about 0.89 and the intensity of the example side lobe 408b is about 0.87. In some examples, the side lobes will be equal and in some examples the side lobes will be different (e.g., due to noise). When the two side lobes are different, the optimal phase selector 204 may select the highest side lobe, the lowest side lobe, or an average between the two side lobes to determine the peak to side lobe ratio. In the example correlation graph 400 using an average side lobe, the peak to side lobe ratio is 1.113 (e.g., 0.95/0.88).

The second example correlation graph 402 of FIG. 4 represents a correlation between the reflected signal 109 and the reconstructed reference signal interpolated by the example interpolator 200 of FIG. 2 and shifted by a second phase different from the first phase. The example peak 410 represents the intensity of the energy for the correlation, the higher the intensity the more optimal the correlation plot. The example peak 410 of the second example correlation graph 402 is about 1.0. The example side lobes 412a, b represent the intensity of the correlation whose intensity is closest to the peak 410. The intensity of the example side lobes 412a, b are each about 0.71. In the example correlation graph 400, the peak to side lobe ratio is 1.408 (e.g., 1.0/0.71).

The third example correlation graph 404 of FIG. 4 represents a correlation between the reflected signal 109 and the reconstructed reference signal interpolated by the example interpolator 200 of FIG. 2 and shifted by a third phase different from the first and second phases. The example peak 414 represents the intensity of the energy for the correlation, the higher the intensity the more optimal the correlation plot. The example peak 414 of the first example correlation graph is about 0.96. The example side lobes 408a, b represent the intensity of the correlation whose intensity is closest to the peak 406. The intensity of the example side lobe 408a is about 0.9 and the intensity of the example side lobe 408b is about 0.84. In some examples, the side lobes will be equal and in some examples the side lobes will be different (e.g., due to noise). When the two side lobes are different, the optimal phase selector 204 may select the highest side lobe, the lowest side lobe, or an average between the two side lobes to determine the peak to side lobe ratio. In the example correlation graph 400 using an average side lobe, the peak to side lobe ratio is 1.103 (e.g., 0.96/0.87).

When the example optimal phase selector 204 (FIG. 2) receives the example correlations 203 represented by the example correlation graphs 400, 402, 404, the optimal phase selector 204 may determine the optimal correlation based on the correlation with the highest peak, the steepest peak, the highest peak to side lobe ratio, and/or any other optimal metric. In the illustrated example of FIG. 4, the optimal phase selector 204 would select the correlation plot corresponding to the second example correlation graph 402 because the example peak 410 is higher (e.g., 1.0 intensity) than the peaks 406, 414 of the first and third example correlation graphs 400, 404 (e.g., 0.95 and 0.96, respectively). Additionally, the steepness of the example peak 410 is higher than the steepness of the peaks 406, 414 of the first and third example correlation graphs 400, 404. Additionally, the peak to side lobe ratio of the example peak 410 is higher (e.g., 1.408) than the peak to side lobe ratios of the first and third example correlation graphs 400, 404 (e.g., 1.113, 1.103, respectively). In this manner, the example optimal phase selector 204 will determine the optimal phase based on the second phase associated with the second example correlation graph 402. As described above, the optimal phase corresponds to the distance to the example target 102 of FIG. 1.

Figure 5:
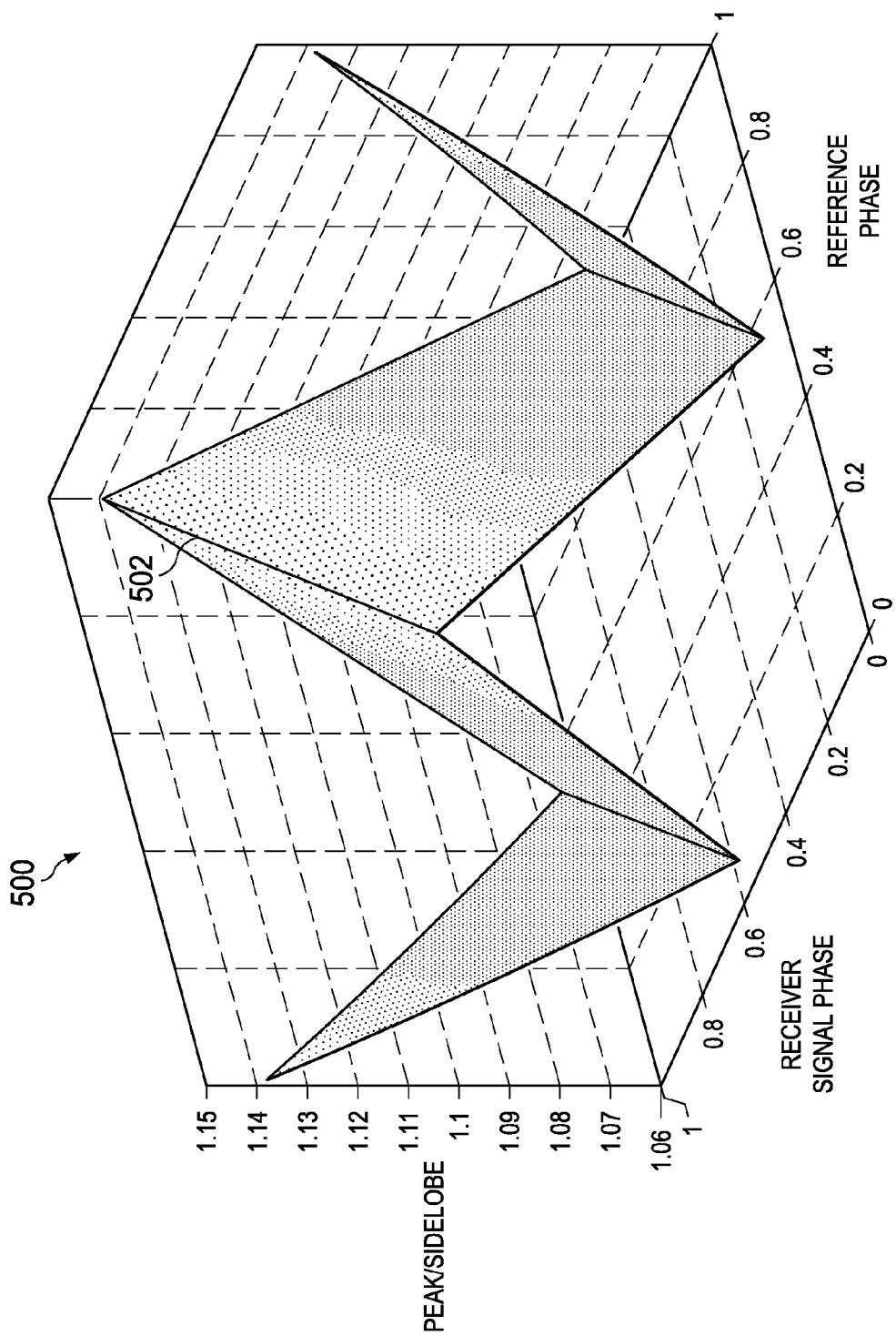
FIG. 5 is a graph illustrating example peak to side lobe ratios of example correlations as a function of the reference signal phase and the reflected signal phase.

FIG. 5 is an example graph 500 displaying the peak to side lobe ratio as a function of the reference signal phase and the reflected signal phase. The example graph 500 includes a maximum ratio ridge 502. As shown in the example graph 500, when the phases of the reference signal phase and the reflected signal phase are in phase (e.g., the same), the peak to side lobe ratio is at a maximum, as reflected by the maximum ratio ridge 502. As the reflected signal 109 and the reference signal go further out of phase (e.g., the reflected signal 109 and the reference signal are misaligned), the peak to side lobe ratio degrades, which leads to inaccurate distance estimations. The example graph 500 illustrates the accuracy of using a peak to side lobe ratio as an indicator of an optimal correlation to determine distance.

FIGS. 6A, 6B, 6C, and 6D are example result graphs 600, 610, 620, 630 illustrating the accuracy and precision of examples disclosed herein at various phase interpolations (e.g., 'Y'=0, 'Y'=4, 'Y'=10, and 'Y'=100) within a range of 30-40 meters. The example graphs 600, 610, 620, 640 include an example positive 3-sigma (e.g. worst case) error 602, an example negative 3-sigma error 604, an example accuracy error 606 (e.g., average error), and an example precision error 608 (e.g., standard deviation of the accuracy 606).

Figure 6A:
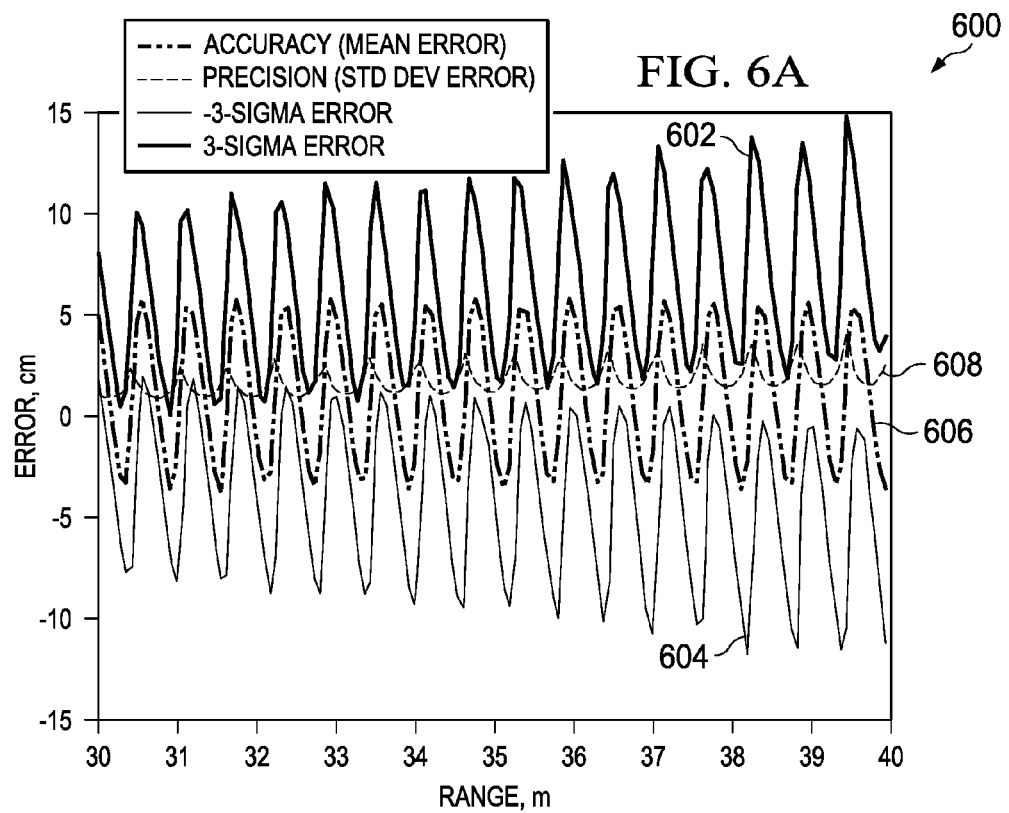

FIG. 6A includes the example result graph 600 where the example interpolator 200 of FIG. 2 interpolates based on the reference signal samples but does not create any additional reconstructed reference signals based on phase shifts (e.g., 'Y'=0). As shown in the example result graph 600, the performance of the example positive 3-sigma error 602, the example negative 3-sigma error 604, the example accuracy error 606, and the example precision error 608 varies significantly over distance. The example positive 3-sigma error 602 is highest (e.g. 15 cm) at around 39.5 meters. The example negative 3-sigma error 604 is highest (e.g. -12 cm) at around 38.2 meters. The highest example accuracy error 606 is around 6 cm throughout the range. The example precision error 608 is highest (e.g. 5 cm) at around 39.5 meters.

Figure 6B:
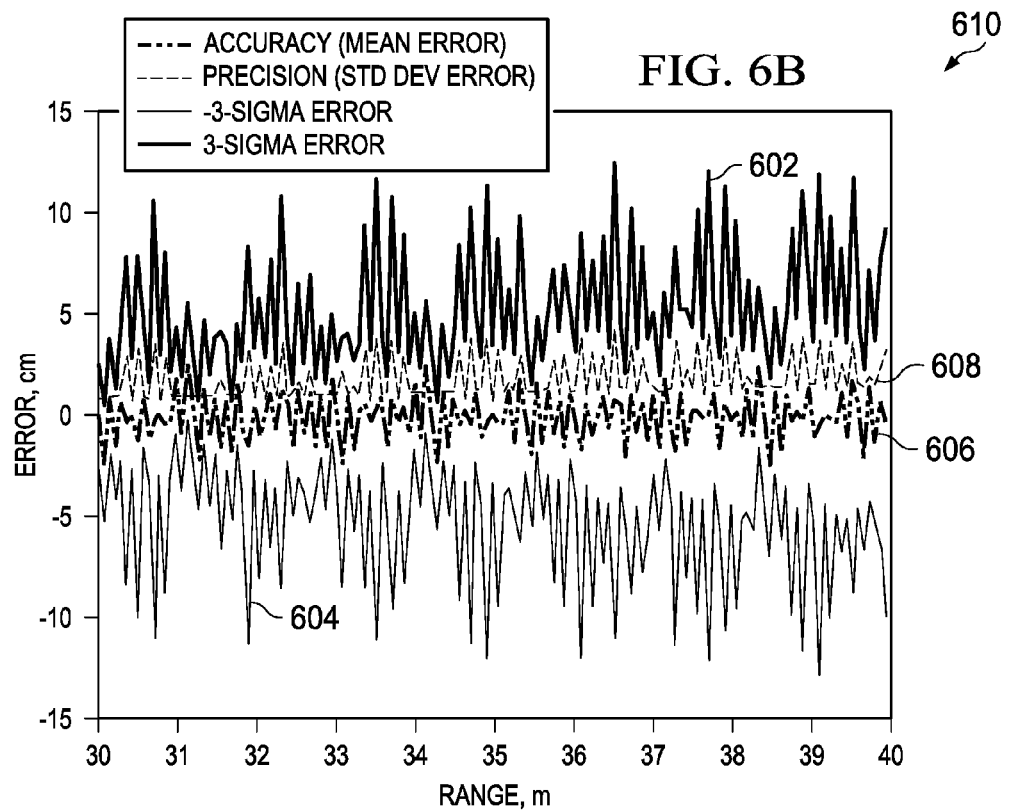

FIG. 6B includes the example result graph 610 where the example interpolator 200 of FIG. 2 interpolates based on the reference signal samples at a four time reference phase interpolation at four different phase offsets (e.g., 'Y'=4). As shown in the example result graph 610, the performance of the example positive 3-sigma error 602, the example negative 3-sigma error 604, the example accuracy error 606, and the example precision error 608 varies less over distance than the example result graph 600 representative of 'Y'=0. The example positive 3-sigma error 604 is highest (e.g. 12 cm) at around 36.5 meters. The example negative 3-sigma error 604 is highest (e.g. -12 cm) at around 39.1 meters. The highest example accuracy error 606 is around 3 cm throughout the range. The example precision error 608 is highest (e.g. 3 cm) at around 31.2 meters.

FIG. 6C includes the example result graph 620 where the example interpolator 200 of FIG. 2 interpolates based on the reference signal samples at a ten time reference phase interpolation at ten different phase offsets (e.g., 'Y'=10). As shown in the example result graph 620, the performance of the example positive 3-sigma error 602, the example negative 3-sigma error 604, the example accuracy error 606, and the example precision error 608 varies less over distance than the example result graph 610 representative of 'Y'=4. The example positive 3-sigma error 604 is highest (e.g. 7 cm) at around 39 meters. The example negative 3-sigma error 604 is highest (e.g. −7 cm) at around 39 meters. The highest example accuracy error 606 is around 1 cm throughout the range. The example precision error 608 is highest (e.g. 3 cm) at around 39 meters.

FIG. 6D includes the example result graph 630 where the example interpolator 200 of FIG. 2 interpolates based on the reference signal samples at a 100 time reference phase interpolation at ten different phase offsets (e.g., 'Y'=100). As shown in the example result graph 630, the performance of the example positive 3-sigma error 602, the example negative 3-sigma error 604, the example accuracy error 606, and the example precision error 608 varies less over distance than the example result graph 610 representative of 'Y'=10. The example positive 3-sigma error 604 is highest (e.g. 7 cm) at around 39.5 meters. The example negative 3-sigma error 604 is highest (e.g. −7 cm) at around 39.8 meters. The highest example accuracy error 606 is around 0.8 cm throughout the range. The example precision error 608 is highest (e.g. 2 cm) at around 40 meters.

As shown in the example results graphs 600, 610, 620, 630 of FIGS. 6A-D, as the multiple reference phase interpolations (e.g. 'Y') between the reference signal samples (e.g. 'X') increases, the error and variation over distance decreases. In this manner, the example ranging system 100 of FIG. 1 can utilize low rate sampling to reduce cost, complexity, and power while maintaining low accuracy error and precision error.

Figure 7:
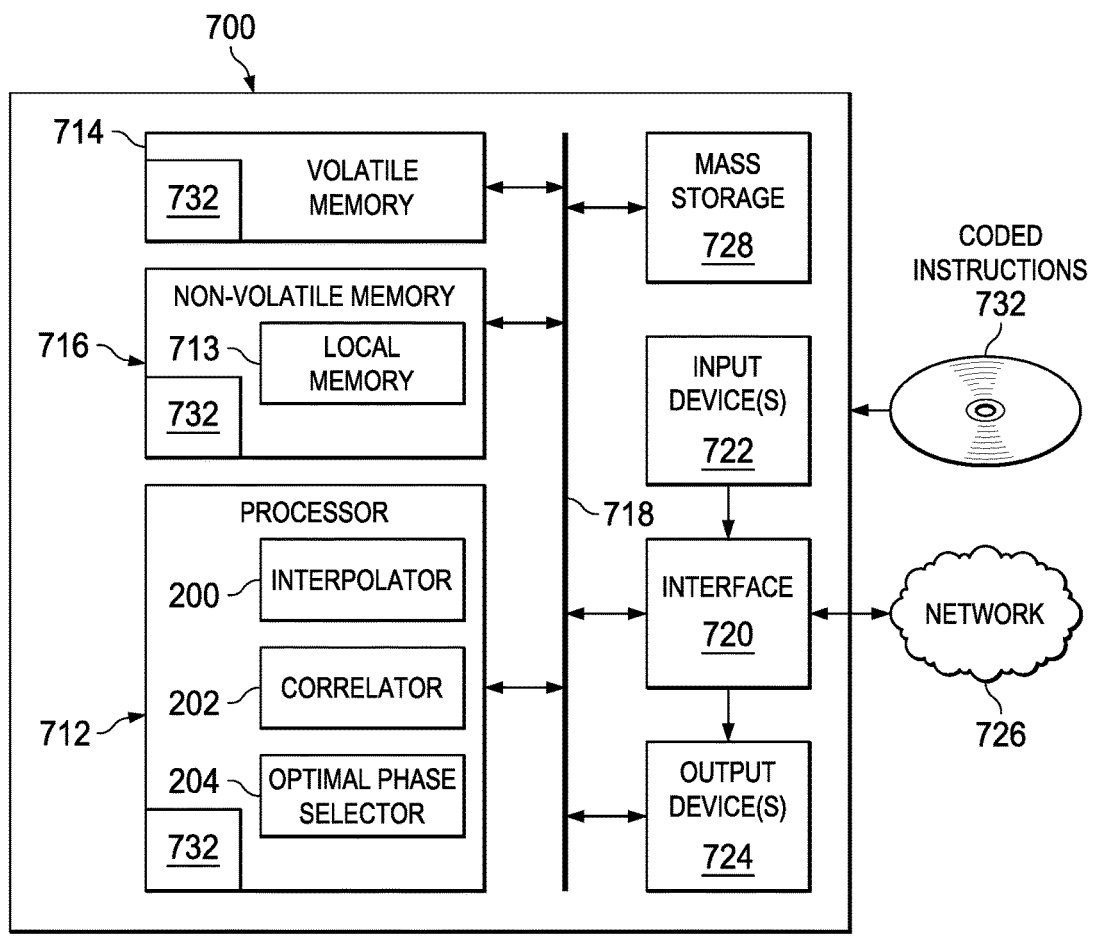
FIG. 7 is a block diagram of a processor platform structured to execute the example machine readable instructions of FIG. 3 to control the example distance estimator of FIGS. 1 and 2.

FIG. 7 is a block diagram of an example processor platform 700 capable of executing the instructions of FIG. 3 to implement the example distance estimator 116 of FIGS. 1 and 2. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes the instructions of FIG. 3 to implement the example interpolator 200, the example correlator 202, and the example optimal phase selector 204 of FIG. 2 to implement the example distance estimator 116. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 3 may be stored in the mass storage device 728, in the volatile memory 714, in the non-volatile memory 716, and/or on a removable tangible computer readable storage medium such as a CD or DVD.

From the foregoing, it would be appreciated that the above disclosed method, apparatus, and articles of manufacture accurately determine a distance of a target by comparing a low rate sampled reflected signal to a low rate sampled reference signal. Examples disclosed herein interpolate based on the low rate samples and generate a plurality of phase-shifted, reconstructed reference signals to generate a plurality of correlations to the reflected signal 109. Examples disclosed herein determine the distance to the target based on the phase associated with the best correlation. Using the examples disclosed herein, ranging systems reduce cost, complexity, and/or power while estimating accurate distances of targets.

Some conventional techniques sample the received signals at a very high rate. However, such conventional techniques require more complex, expensive, and power consuming systems. Some conventional techniques sample at a low rate without phase-interpolation. However, such conventional techniques provide poor distance estimates. Examples disclosed herein alleviate such problems by sam-

What is claimed is:

1. A method comprising:
   receiving first and second samples of a reference signal having a frequency;
   generating reconstructed reference signals having the frequency at different phase offsets, including by interpolating between the first and second samples;
   receiving a signal reflected off an object, wherein the signal reflected off the object includes a reflection of the reference signal off the object, and the first and second samples are of the reference signal without reflection off the object;
   generate correlations by correlating the reconstructed reference signals with the signal reflected off the object;
   selecting a phase based on the correlations; and
   determining a distance of the object based on the selected phase.

2. The method of claim 1, wherein the reference signal is transmitted from a transducer.

3. The method of claim 1, wherein the selected phase corresponds to the distance of the object.

4. The method of claim 1, wherein the different phase offsets are between the first sample and the second sample.

5. The method of claim 1, wherein the correlations include respective peak values and respective side lobe values.

6. The method of claim 5, wherein the correlations correspond to the different phase offsets.

7. The method of claim 6, wherein selecting the phase includes selecting the phase based on at least one of: a highest peak value of the correlations; or a highest peak to side lobe ratio of the correlations.

8. The method of claim 7, further comprising determining a delay based on the selected phase, the delay corresponding to the distance.

9. The method of claim 8, further comprising performing a curve fit operation around the highest peak value to determine a fine estimate of the highest peak value, the highest peak value corresponding to the delay.

10. An apparatus comprising:
    an interpolator having an output, the interpolator configured to: receive first and second samples of a reference signal having a frequency; generate reconstructed reference signals having the frequency at different phase offsets, including by interpolating between the first and second samples; and provide the reconstructed reference signals at the output of the interpolator;
    a correlator having an input coupled to the output of the interpolator, the correlator having an output, and the correlator configured to: receive a signal reflected off an object, wherein the signal reflected off the object includes a reflection of the reference signal off the object, and the first and second samples are of the reference signal without reflection off the object; generate correlations by correlating the reconstructed reference signals with the signal reflected off the object; and provide the correlations at the output of the correlator; and
    a phase selector having an input coupled to the output of the correlator, the phase selector having an output, and the phase selector configured to: select a phase based on the correlations; determine a distance of the object based on the selected phase; and provide the distance at the output of the phase selector.

11. The apparatus of claim 10, further comprising a transducer configured to transmit the reference signal.

12. The apparatus of claim 10, wherein the selected phase corresponds to the distance of the object.

13. The apparatus of claim 10, wherein the different phase offsets are between the first sample and the second sample.

14. The apparatus of claim 10, wherein the correlations include respective peak values and respective side lobe values.

15. The apparatus of claim 14, wherein the correlations correspond to the different phase offsets.

16. The apparatus of claim 15, wherein the phase selector is configured to select the phase based on at least one of: a highest peak value of the correlations; or a highest peak to side lobe ratio of the correlations.

17. The apparatus of claim 16, where the phase selector is configured to determine a delay based on the selected phase, the delay corresponding to the distance.

18. The apparatus of claim 17, wherein the phase selector is configured to perform a curve fit operation around the highest peak value to determine a fine estimate of the highest peak value, the highest peak value corresponding to the delay.

* * * * *